Feb. 25, 1958    R. I. VAN NICE ET AL    2,824,698
RECYCLING PULSE COUNTER
Filed Oct. 4, 1955
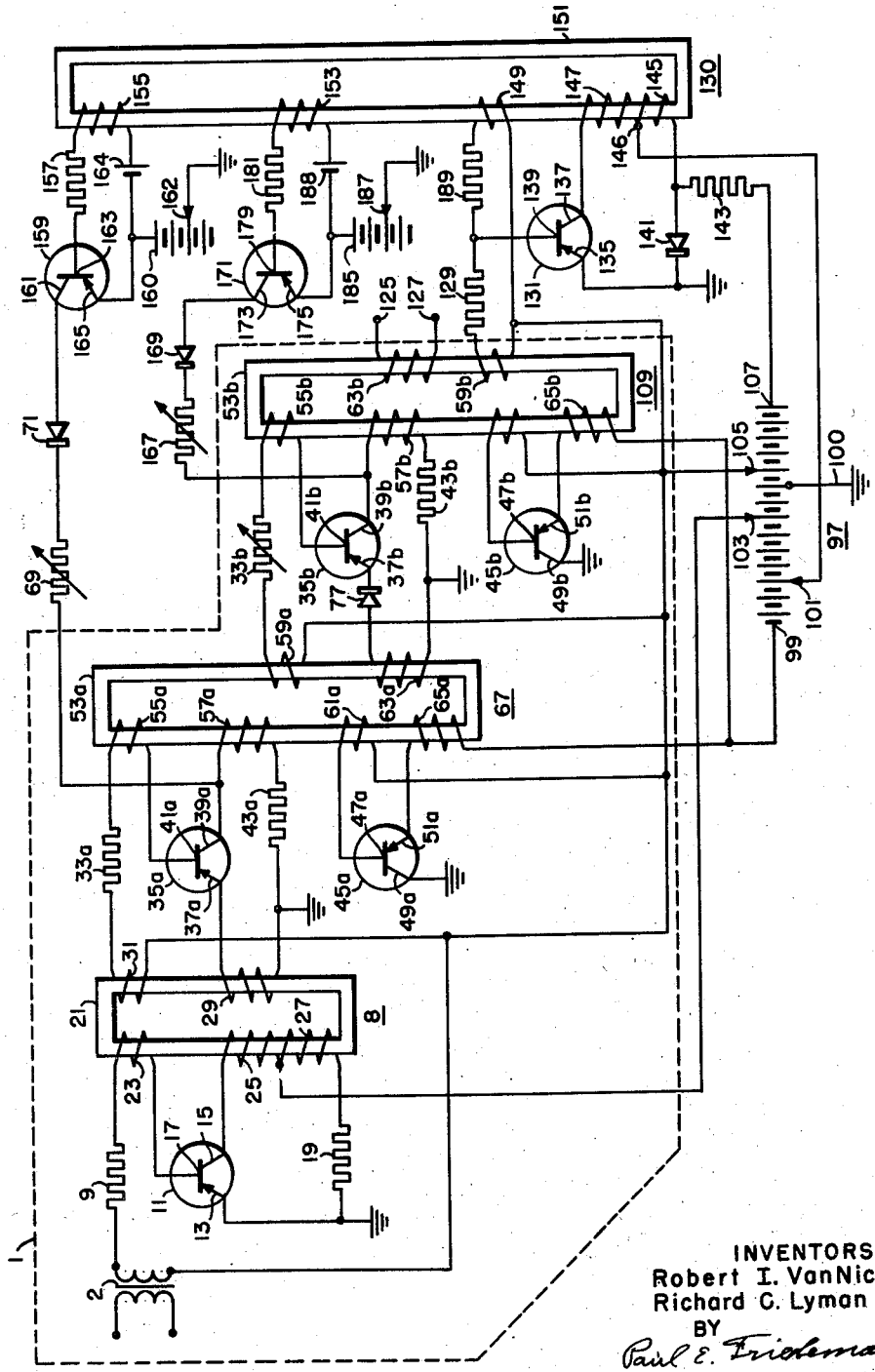
INVENTORS
Robert I. VanNice &
Richard C. Lyman
BY
Paul E. Friedemann
ATTORNEY United States Patent Office 2,824,698
Patented Feb. 25, 1958

2,824,698

RECYCLING PULSE COUNTER

Robert I. Van Nice, Shaler Township, Allegheny County, and Richard C. Lyman, Castle Shannon, Pa., assignors to Westinghouse Electric Corporation, East Pittsburgh, Pa., a corporation of Pennsylvania Application October 4, 1955, Serial No. 538,438

15 Claims. (Cl. 235—92)

This invention relates to recycling pulse counting circuits and more particularly to pulse counting circuits of the type wherein are utilized pulse count storage devices of the magnetic-storage type.

In the copending application of G. F. Pittman, Jr., R. O. Decker and R. L. Bright for "Control Apparatus," Serial No. 435,211, filed June 8, 1954, there is described a type of pulse counter circuit wherein the pulses to be counted are "stored" by means of magnetic storage devices. The pulses, which may be of varying waveshapes and time duration, are converted to pulses of uniform waveshape and constant pulse width and applied to a counter comprising a plurality of tandem connected counting stages. In each stage, an incoming pulse is applied to an input winding so as to change the magnetic flux level in a magnetic core by a predetermined amount from saturation in one sense toward saturation in the opposite sense. As soon as the core is driven to saturation in said opposite sense by a predetermined number of input pulses, the core registers an output pulse and is automatically driven back to saturation in the first sense by circuit means connected to additional winding means on the core. The circuit means may comprise a switchnig transistor which is biased to cut off while the input pulses are driving the core toward saturaton in said opposite sense, and to full current conduction once the core is so driven to saturation. The input winding is disconnected from the prior stage during the time that the core is resetting toward saturation in the first sense, conveniently by a switching transistor biased to full current conduction during the counting interval and to cut off during the resetting interval. The transistors are biased by auxiliary voltage sources in conjunction with additional windings on the core into which voltages of appropriate polarity are induced by the change of flux in the core.

While the counter described in the aforementioned patent application has been found to be eminently satisfactory for the purpose for which it was designed, it has been found to suffer from certain shortcomings. For example, assuming that each stage of the counter can be set to count any number from one to a given number, ten for example, the count of several tandem connected stages will be the product of the counts of the individual stages. A two stage decade counter, therefore, can be set for counts of 100, 90, 81, etc., but not for counts of 99 to 91, 89 to 82, etc.

One object of this invention is to provide an electrical pulse counter circuit having a plurality of tandem connected counter stages in each of which the count at any given instant may be represented as a magnetic flux level in a saturable magnetic core, each core being capable of receiving a predetermined number of input pulses before reaching saturation and each stage generating an output pulse when the core thereof reaches saturation wherein the counter circuit may count any number of pulses up to the number required to fill the counter.

Another object is to provide an electrical pulse counter circuit having a plurality of tandem connected counter stages each of which is adapted to count a predetermined number of pulses fed thereto and thereupon generate an output pulse to be fed to the succeeding counter stage, wherein the counter circuit may generate an output signal indicative of the reception of any predetermined number of input pulses up to the number required to fill the counter circuit.

Still another object is to provide a recycling pulse counter including a plurality of tandem connected counter stages in each of which stages a pulse count is represented as the magnetic flux level in a saturable core driven before saturation in one sense and after saturation in the opposite sense, having a pulse generator responsive to a counter output pulse for the purpose of setting the flux level in the magnetic cores to a predetermined magnetic flux level corresponding to a predetermined initial count, wherein the output of the pulse generator is substantially rectangular in wave form.

Yet another object is to provide a delayed pulse generator of the type wherein an input signal drives a magnetic core to saturation in one sense to derive an output pulse of one polarity and circuit means associated with the core thereupon drives the core to saturation in the opposite sense to derive an output pulse of the opposite polarity wherein each portion of the output wave form is of substantially rectangular cross section.

According to one aspect of the present invention, the flux level in each magnetic core in a counter circuit is caused to vary so as to be representative of the count stored therein and is set to a predetermined magnetic flux level such that the flux level of all of the cores in the counter at the beginning of a series of pulses is indicative of a number equal to the difference between the total count that the system is capable of storing and the count at which an output pulse is desired. For example, assume that a three stage decade counter is to count 643 pulses before registering an output pulse. The counter is capable of counting a maximum of one thousand pulses before registering an output so the flux levels in the storage cores are set at levels ordinarily reached after 357 input pulses when the initial flux level corresponds to zero count. It is apparent, therefore, that an output pulse will be produced after 643 pulses have been injected into the system.

According to another aspect of the invention, the initial flux level is set by injecting into a winding on each of the storage cores a pulse one characteristic (duration or magnitude) of which is variable in accordance with the count to be stored. The pulse is initiated after an output pulse has been derived from the system and in response to the derivation of the output pulse. By varying the aforesaid pulse characteristic, the total volt-seconds of E. M. F. applied to the winding may be varied to set the magnetic flux level of the core associated therewith to a value corresponding to the desired preset count.

A feature of the invention lies in the apparatus for deriving a pulse subsequent to and responsive to derivation of an output pulse from the last counter stage. In the pulse shaping circuit described in the aforementioned patent application by Pittman et al., the magnetic core was driven in one sense to saturation by means of a main winding through a transistor switch and thereafter to saturation in the opposite sense by means of a reset winding coupled to a current source through a resistor. The reset pulse obtained thereby was rounded and of considerable time duration due to the fact that when the resistor was of a value sufficiently high to limit current drain from the reset current source it was insufficient to quickly reset the magnetic core. It has been found that a substantially rectangular reset pulse may be obtained by means of a nonlinear resistance element that presents very low resistance to small current and high resistance to large current so that sufficient current is provided for fast reset but current flow is restricted to a very low value after the core reaches saturation at the end of its resetting cycle.

Other objects and features of this invention will become apparent upon consideration of the following description thereof when taken in connection with the accompanying drawing, wherein the single figure depicts one embodiment of the invention.

The apparatus designated by reference numeral 1 is a reset, recycling pulse counter such as described in the aforementioned patent application by G. F. Pittman et al. The counter generally comprises a pulse shaping circuit 8 for converting input pulses of any wave shape to pulses of uniform wave shape and pulse duration, which pulse shaper is coupled to a plurality of tandem connected counter stages here designated as 67 and 109. The two counter stages shown are similar in structure, and hereafter similar circuit components in each stage will be given the same reference numerals and will be differentiated as to counter stage by the subscripts "a" and "b."

The pulse shaping circuit 8 generally comprises a magnetic core 21 having in inductive relationship therewith a main winding 25, a holding winding 23, a reset winding 27, and a pair of output windings 29 and 31. A voltage source 97 having a plurality of taps thereon is coupled to the pulse shaping stage 8 and the succeeding counter stages to supply operating potentials therefor. A switching transistor 11 having an emitter 13, collector 15 and base 17 is provided for the purpose of controlling the relative effects of main winding 25 and reset winding 27. More specifically, the voltage between source tap 103 and ground 100 is coupled across main winding 25 through the emitter-to-collector current conduction path of transistor 11 so as to drive magnetic core 21 to saturation in one sense when the transistor is rendered conducting. The transistor is normally biased to nonconduction by means of the bias source voltage between tap 105 and ground 100. For the purpose of driving transistor 11 between cutoff and collector current saturation, input pulses from an external source (not shown) are injected into the circuit between tap 105 and base 17 through the secondary winding of transformer 2, which winding is in series circuit relationship with resistor 9 and holding winding 23. Reset winding 27 is connected to tap 103 and to ground through a resistor 19 so that current therefrom will normally drive core 21 to saturation in a sense opposite to the aforementioned one sense. Input pulses from transformer 2 overcome the effect of the bias provided by tap 103 to drive transistor 11 to current saturation so that current flows through winding 25. A voltage thereby induced in winding 23 will hold the transistor conducting after the input pulse disappears until the core reaches saturation; thereupon, the holding voltage will disappear and current through winding 27 will be effective to drive the core back to saturation in the aforesaid opposite sense. Inasmuch as the voltage applied to winding 25, through transistor 11, is relatively constant, the output pulses generated across windings 29 and 31 will be of uniform amplitude and constant duration.

Counter stage 67 includes a saturable magnetic core 53a having main or input winding 57a, blocking winding 55a, control or reset winding 65a, holding winding 61a and output windings 59a and 63a. Winding 57a is coupled to winding 29 through resistor 43a and the emitter-to-collector current conduction path of switching transistor 35a. Switching transistor 35a is normally biased to cutoff by the voltage between tap 105 and ground through windings 31 and 55a and resistor 33a. Reset winding 65a is coupled between bias source terminal 99 and ground through the emitter-to-collector current conduction path of switching transistor 45a.

The construction of counter stage 109 is the same as that of counter stage 67, interstage coupling being effected between winding 59a and 55b through resistor 33b and between output winding 63a and main winding 57b through half-wave rectifier 77, the emitter 37b to collector 39b current conduction path of the transistor 35b and resistor 43b.

The functions of switching transistors 35a and 35b are to couple input pulses from the preceding stage to which the individual transistor is coupled to the main windings of the following core during the periods over which an output pulse appears across the output windings of the preceding counter stage while the core thereof is resetting, or of the preceding pulse generator stage while its core is being driven to saturation prior to resetting, whichever is appropriate, and to decouple the main winding from the output of the preceding stage during the period over which the core of the preceding stage is being driven to saturation by input pulses. Further, the transistors decouple the preceding stage from the counting stage in question while the core of the counting stage is being reset. The function of transistors 45a and 45b is to couple the reset windings 65a and 65b to the voltage source while the respective core associated therewith is resetting and to decouple the reset windings of the core while it is being driven to saturation by input pulses.

The operation of the pulse shaper 8 and counter stages 67 and 109 is as follows. Input pulses from pulse shaping stage 8 appearing across winding 31 will bias transistor 35a to conduction by making base 41a negative with respect to emitter 37a (all transistors in the apparatus described herein being assumed to be P–N–P type, junction transistors). The pulse simultaneously appearing across winding 29 will be coupled to winding 57a to drive core 53a toward saturation. At the end of the pulse, the core will remain in substantially the same magnetic state at which it found itself at the end of the pulse. After a predetermined number of input pulses, most conveniently ten, core 53a will be driven to saturation. At the end of the pulse the magnetization level will fall back to its residual state and the rate of change in magnetic flux resulting therefrom will be sufficient to induce a voltage across winding 61a of such magnitude as to bring base 47a of transistor 45a negative with respect to emitter 51a. Transistor 45a will be switched to its conductive state causing current to flow through its emitter-to-collector current conduction path and the voltage 99 thus applied on winding 65a will drive core 53a to negative saturation. As the core is driven to negative saturation the voltage induced across winding 61a will be such as to hold base 47a negative with respect to emitter 51a and to insure saturating collector current conduction through transistor 45a. (Alternatively, the voltage appearing across resistor 43a at the end of an input pulse after saturation of core 53a may be utilized to initially drive base 47a negative with respect to emitter 51a as taught in the aforementioned patent application of G. F. Pittman et al. In other respects, the circuitry of the counter stages is the same as that described in the Pittman et al. application.)

Counter stage 109 is similar to counter stage 67 and any number of counter stages may be connected similarly in cascade. For the purpose of facilitating the explanation of the circuit, only two counter stages have been shown, the output of the counter being derived across terminals 125 and 127 of output winding 63b.

Output winding 59b is provided for the purpose of actuating a delayed pulse generator 130, the function of which is to provide a control pulse for the purpose of setting the magnetic flux level of cores 53a and 53b to predetermined magnitudes after a pulse has been derived across terminals 125 and 127 and before the next succeeding input pulse is fed to transformer 2. The delayed pulse generator comprises a magnetic core 151 which preferably has a rectangular loop characteristic, on which core are inductively disposed a main winding 147, reset winding 145, holding winding 149 and output windings 153 and 155. The output pulse appearing across winding 59b is applied to holding winding 149 through serially connected resistors 129, 189. Main winding 147 is connected between ground and a negative tap 101 of voltage source 97 through the emitter to collector current conduction path of P–N–P junction switching transistor 131; winding terminal 146 is connected to tap 101 with the other terminal of winding 147 being connected to collector 137. Emitter 135 of transistor 131 is connected to ground.

Reset winding 145 is connected between negative polarity tap 101 and ground through half-wave rectifier 141, and between tap 101 and positive bias source terminal 107 through resistor 143. The function of resistor 143, semi-conductor diode 141 and winding 145 is to permit sufficient reset current to flow through winding 145 to rapidly reset the core but to prevent current flow as much as possible when the core is not being reset. In effect the circuit provides a nonlinear resistor in series with winding 145 which provides small resistance to low currents and high resistance to large currents. The nonlinearity of the circuit depends on the unilateral characteristic of the diode; the net current flow through a diode can be only in the forward direction. The term "net flow" is of importance here because a substantial back current may appear to flow with reference to a diode if there is an equal or larger forward current flow through the diode. This forward current is supplied by the potential between ground and voltage terminal 107 of voltage source 97. Back currents larger than the forward current flow through the resistor and battery and hence meet considerable resistance. Thus, the back current through the diode may be derived from the portion of voltage source between ground and tap 101 and will flow through winding 145 until core 151 reaches saturation in a negative sense; the reactance of the winding will thereupon drop and the current therethrough will tend to increase if the reset current through semiconductor diode 141 is equal to or only slightly less than the maximum back current that can flow therethrough. The current through winding 145 will be unable to increase past the maximum back current that can flow assuming a given forward current flowing through rectifier 141 from resistor 143. Thus the combination of voltage between terminal 107 and ground, rectifier 141 and resistor 143 acts in effect as a nonlinear impedance adapted to shift from a low value of impedance to a high value of impedance when a given magnitude of current flows therethrough.

The output pulses, resulting from reset of core 151 by voltage 101 through winding 145, appearing across output windings 153 and 155 are utilized to trigger transistors 171 and 159 respectively into their conduction regions. Transistor 171 is normally biased to cutoff by battery 188 through current limiting resistor 181; similarly, transistor 159 is biased to cutoff by battery 164 connected through resistor 157 between emitter 165 and base 163. Windings 153 and 155 are serially connected with batteries 188 and 164, respectively, so that the voltage induced thereacross when core 151 resets under the influence of current flowing through winding 145 is of opposite polarity with respect to the respective bias batteries and is of sufficient magnitude to overcome the effect of the bias batteries. A voltage source 185 having an adjustable tap 187 is coupled to winding 57b of counter 109 through the emitter 175 to collector 173 current conduction path of transistor 171, half-wave rectifier 169 and adjustable resistor 167. The polarity of D. C. source 185 is such as to cause current flow through winding 57b and resistor 43b to ground to drive the magnetic flux level of core 53b toward saturation in the same sense as an input pulse from winding 63a. Tap 187 of D. C. source 185 is connected to ground.

Similarly, a D. C. source 160 is provided which is coupled to winding 57a through the emitter 165 to collector 161 current conduction path of transistor 159, half-wave rectifier 71, and variable resistor 69. D. C. source 160 similarly is variable having an adjustable tap 162 connected to ground. The current derived from D. C. source 160 is utilized to drive core 53a to saturation in the same sense as effected by an input pulse derived from winding 29.

The function of resistors 69 and 167 is to provide a trimming action so as to modify the relatively large voltage increments that may be available from D. C. sources 160 and 185 in the event that the D. C. sources are tapped batteries or similar devices having output voltage variable by substantial increments. The function of diodes 71 and 169 is to insure that voltages appearing at the collector terminals of transistors 35a and 35b will not affect the operation of transistors 159 and 171.

The taps 162 and 187 are set to adjust the magnetization level to be reached by cores 53a and 53b to the desired levels. In operation, an output pulse appearing across winding 59b will trigger transistor 131 to conduction. Current will flow through winding 147 driving core 151 to saturation in one sense simultaneously with the resetting of core 53b. The voltage induced across winding 149 will be sufficient to insure that transistor 131 remains conducting until it reaches saturation in the said one sense. As soon as saturation is reached, the transistor will be rendered nonconducting by the bias potential appearing between tap 105 and ground and a large current will flow through winding 145 until the core is reset. While the core is being driven to saturation in the one sense, the voltage appearing across windings 153 and 155 will supplement the bias voltages of sources 164 and 188 to further bias transistors 159 and 171 to cutoff. While the core 151 is being reset, transistors 159 and 171 will be rendered conducting and the voltage of sources 160 and 185 will be coupled to windings 57a and 57b to set cores 53a and 53b to magnetization levels determined by the setting of taps 162 and 187 and the duration of the resetting pulses appearing across windings 155 and 153. Since these pulses are of constant duration, the flux levels in cores 53a and 53b will thus be determined by the adjustment of taps 162 and 187.

The output pulses developed by the delayed pulse generator are substantially rectangular in wave form both on the forward and reset half cycles of operation. By adjusting the taps 162 and 187, the initial flux level of cores 53a and 53b may be preset to any desired level corresponding to any desired pulse count so that input pulses subsequently appearing at transformer 2 will be effective to render an output pulse from the counter after any predetermined number of input pulses and not only after predetermined numbers of input pulses excluding given ranges of numbers.

The invention is not to be restricted to the specific structural details, arrangement of parts or circuit connections herein set forth, as various modifications thereof may be effected without departing from the spirit and scope of the invention.

We claim as our invention:

1. A counting circuit comprising: a plurality of tandem-connected counter stages each adapted to produce an output pulse from output terminals thereof upon reception of a predetermined number of input pulses at input terminals thereof; each stage including a saturable magnetic core having a substantially rectangular hysteresis characteristic, said core having at least input winding means, blocking winding means, output winding means and reset winding means in inductive relationship therewith; switch means responsive to energization by pulses from said input terminals through said blocking winding means for energizing said input winding to drive said core toward saturation in a given sense, means energizing said reset winding means to drive said core away from saturation in said given sense, said blocking winding means being further adapted to energize said switch means independently of electrical signals at said input terminals while said core is proceeding to saturation in said given sense; first means for deriving a pulse from the output of said tandem connected counter stages after derivation of an output signal from the output stage thereof; and a signal source means in circuit relationship with said each of said counter stages responsive to said first means to set the magnetic flux level in each of said magnetic cores at a predetermined value upon reception of a pulse from said means.

2. A counting circuit comprising: a plurality of tandem-connected counter stages each adapted to produce an output pulse from output terminals thereof upon reception of a predetermined number of input pulses at input terminals thereof; each stage including a saturable magnetic core having a substantially rectangular hysteresis characteristic, an input winding means, blocking winding means, output winding means and reset winding means in inductive relationship therewith, switch means responsive to energization by pulses from said input terminals through said blocking winding means for energizing said input winding to drive said core toward saturation in a given sense, means energizing said reset winding means to drive said core away from saturation in said given sense, said blocking winding means being further adapted to energize said switch means independently of electrical signals at said input terminals while said core is proceeding to saturation in said given sense; first means for deriving a pulse from the output of said tandem connected counter stages after derivation of an output signal from the output stage thereof; an adjustable potential source in circuit relationship with each of said counter stages for energizing a winding thereof to set the flux level of the magnetic core thereof at a predetermined value upon reception of a pulse from said first means.

3. A counting circuit comprising: a plurality of tandem-connected counter stages each adapted to produce an output pulse from output terminals thereof upon reception of a predetermined number of input pulses at input terminals thereof; each stage including a saturable magnetic core having a substantially rectangular hysteresis characteristic, an input winding means, blocking winding means, output winding means and reset winding means in inductive relationship therewith, switch means responsive to energization by pulses from said input terminals through said blocking winding means for energizing said input winding to drive said core toward saturation in a given sense, means energizing said reset winding means to drive said core away from saturation in said given sense, said blocking winding means being further adapted to energize said switch means independently of electrical signals at said input terminals while said core is proceeding to saturation in said given sense; first means for deriving a pulse from the output of said tandem connected counter stages after derivation of an output signal from the output stage thereof; potential source means in circuit relationship with each of said counter stages for varying the flux level of the magnetic core thereof; second means responsive to change in flux level toward saturation in a sense opposite to said given sense of the magnetic core of the output stage of said tandem connected stages for generating a control pulse of predetermined duration; third means responsive to said control pulse for connecting said potential source means to said counter stages for the duration of said control pulse, and fourth means in circuit relationship with said potential source means for adjusting the magnitude of the voltage output therefrom.

4. Apparatus responsive to input pulses and connected to supply output pulses to a load, said apparatus comprising: magnetic core means; main winding means disposed in inductive relationship with said magnetic core means; first circuit means for coupling said input pulses to said main winding means whereby said magnetic core member saturates in one sense after at least one input pulse is applied to said main winding; first switch means; holding winding means and control winding means disposed in inductive relationship with said magnetic core means; second circuit means interconnected with said switch means and said holding winding means for maintaining said switch means non-conductive while said input pulses are being applied to said main winding and for rendering said switch means conductive when said magnetic core member saturates in said one sense; third circuit means interconnected with said switch means and with said control winding means for effecting a flow of current through said control winding means when said switch means is rendered conductive to thereby drive said magnetic core means to saturation in said other sense; first means inductively coupling said load to said core to energize said load in accordance with the change in flux in said magnetic core means as produced by current flow through said control winding means, second means for deriving a control pulse of constant time duration immediately subsequent to the energization of said load, voltage supply means of controllable amplitude responsive to said control pulse for setting the magnetization level of said core means in accordance with said amplitude thereof during the interval between energization of said load and reception of the next input pulse by said main winding means after energization of said load.

5. Apparatus responsive to input pulses and connected to supply output pulses to a load, said apparatus comprising: magnetic core means; main winding means disposed in inductive relationship with said magnetic core means; first circuit means for coupling said input pulses to said main winding means whereby said magnetic core member saturates in one sense after at least one input pulse is applied to said main winding; first switch means; holding winding means and control winding means disposed in inductive relationship with said magnetic core means; second circuit means interconnected with said switch means and said holding winding means for maintaining said switch means non-conductive while said input pulses are being applied to said main winding and for rendering said switch means conductive when said magnetic core member saturates in said one sense; third circuit means interconnected with said switch means and with said control winding means for effecting a flow of current through said control winding means when said switch means is rendered conductive to thereby drive said magnetic core means to saturation in said other sense; first means inductively coupling said load to said core to energize said load in accordance with the change in flux in said magnetic core means as produced by current flow through said control winding means, second means responsive to the energization of said load operative to set the flux magnetization level of said magnetic core means at a predetermined value prior to the reception of an input pulse by said main winding means after said energization of said load.

6. Apparatus responsive to input pulses and connected to supply output pulses to a load, said apparatus comprising: first magnetic core means; main winding means disposed in inductive relationship with said magnetic core means; first circuit means for coupling said input pulses to said main winding means whereby said magnetic core means saturates in one sense after at least one input pulse is applied to said main winding; first switch means; holding winding means and control winding means disposed in inductive relationship with said magnetic core means; second circuit means interconnected with said switch means and said holding winding means for maintaining said switch means non-conductive while said input pulses are being applied to said main winding and for rendering said switch means conductive when said magnetic core means saturates in said one sense; third circuit means interconnected with said switch means and with said control winding means for effecting a flow of current through said control winding means when said switch means is rendered conductive to thereby drive said magnetic core means to saturation in said other sense; first means inductively coupling said load to said magnetic core means to energize said load in accordance with the change in flux in said magnetic core means as produced by current flow through said control winding means; second magnetic core means; second switch means; first winding means inductively disposed on said second magnetic core means adapted to render conductive said second switch means when said second magnetic core means is proceeding to saturation in a first sense, means coupling said first winding means to said first magnetic core means for driving said second magnetic core means to saturation in said first sense when said first magnetic core means is proceeding to saturation in said other sense; second winding means disposed in inductive relationship with said second magnetic core means adapted to be energized when said second switch means is rendered conductive to drive said second magnetic core means to saturation in said one sense; means including unilateral conductive means coupled to said second winding means for driving said second magnetic core means to saturation in a second sense opposite to said first sense; means including third switch means responsive to said second magnetic core means proceeding to saturation in said second sense for generating a control pulse having a characteristic the magnitude of which is controllable by a human operator; means coupling said control pulse to said first magnetic core means so that the magnetic flux level thereof is variable in accordance with said magnitude of said characteristic.

7. Electrical apparatus responsive to input pulses and connected to supply output pulses to a load, comprising: first magnetic core means, main winding means disposed in inductive relationship with said magnetic core means; first circuit means including an impedance member for applying said input pulses to said main winding means, whereby said magnetic core means saturates in one direction after a plurality of said input pulses are applied to said main winding means; switch means having a conductive state and a non-conductive state; holding winding means and control winding means disposed in inductive relationship with said magnetic core member; bias source means connected to maintain said switch means non-conductive while the said input pulses are being applied to the main winding; second circuit means including said holding winding means for biasing said switch means to conduction, when said magnetic core means saturates in said one direction; third circuit means, interconnected with said switch means and with said control winding, for effecting a flow of current through said control winding when said switch means is rendered conductive, to thereby drive said magnetic core means to saturation in said other direction; the current flow through said control winding effecting an induced voltage across said holding winding to maintain said switch means conductive until said magnetic core means saturates in said other direction; means for connecting said load so as to be energized in accordance with the change in flux in said magnetic core means as produced by the current flow through said control winding, and means responsive to the energization of said load operative to set the flux magnetization level of said magnetic core means at a predetermined value prior to the reception of an input pulse by said main winding means after energization of said load.

8. Electrical apparatus responsive to input pulses and connected to supply output pulses to a load, comprising: first magnetic core means, main winding means disposed in inductive relationship with said magnetic core means; first circuit means including an impedance member for applying said input pulses to said main winding means, whereby said magnetic core means saturates in one direction after a plurality of said input pulses are applied to said main winding means; switch means having a conductive state and a non-conductive state; holding winding means and control winding means disposed in inductive relationship with said magnetic core means; bias source means connected to maintain said switch means non-conductive while the said input pulses are being applied to the main winding; second circuit means including said holding winding means for biasing said switch means to conduction, when said magnetic core means saturates in said one direction, to said switch means to thereby render said switch means conductive, third circuit means, interconnected with said switch means and with said control winding, for effecting a flow of current through said control winding when said switch means is rendered conductive, to thereby drive said magnetic core means to saturation in said other direction; the current flow through said control winding effecting an induced voltage across said holding winding to maintain said switch means conductive until said magnetic core means saturates in said other direction; means for connecting said load so as to be energized in accordance with the change in flux in said magnetic core means as produced by the current flow through said control winding; second magnetic core means; second switch means having a conductive state and a non-conductive state; first winding means inductively disposed on said second magnetic core means adapted to render conductive said second switch means when said second magnetic core means is proceeding to saturation in a first sense, means coupling said first winding means to said first magnetic core means for driving said second magnetic core means to saturation in said first sense when said first magnetic core means is proceeding to saturation in said other sense; second winding means disposed in inductive relationship with said second magnetic core means adapted to be energized when said second switch means is rendered conductive to drive said second magnetic core means to saturation in said one sense; means including unilateral conductive means coupled to said second winding means for driving said second magnetic core means to saturation in a second sense opposite to said first sense; means including third switch means responsive to said second magnetic core means proceeding to saturation in said second sense for generating a control pulse having a characteristic the magnitude of which is controllable by a human operator; means coupling said control pulse to said first magnetic core means so that the magnetic flux level thereof is variable in accordance with said magnitude of said characteristic.

9. In a magnetic device responsive to input pulses and connected to supply output pulses to a load, the combination comprising, a magnetic core means, main winding means disposed in inductive relationship with said magnetic core means, circuit means including an impedance member for applying said input pulses to said main winding means, whereby said magnetic core means saturates in one direction after a plurality of the said input pulses are applied to the main winding; a semi-conductive device; a holding winding and a control winding disposed in inductive relationship with the magnetic core member, a bias source connected to maintain said semiconductive device non-conductive while the said input pulses are being applied to the main winding; other circuit means, including said holding winding for rendering said semiconductive device conductive, when said magnetic core means saturates in said one direction; further circuit means, interconnected with said semiconductive device and with said control winding, for effecting a flow of current through said control winding when said semiconductive device becomes conductive, to thereby drive said magnetic core means to saturation in the other direction, the current flow through the control winding effecting an induced voltage across the holding winding to maintain said semiconductive device conductive until said magnetic core means saturates in said other direction; an output winding disposed in inductive relationship with said magnetic core means, means for interconnecting said load with the output winding; means responsive to the energization of said load operative to set the flux magnetization level of said magnetic core means to a predetermined value prior to the reception of an input pulse by said main winding means after energization of said load.

10. In a magnetic device responsive to input pulses and connected to supply output pulses to a load, the combination comprising, a first magnetic core means, a main winding disposed in inductive relationship with the magnetic core means, circuit means including an impedance member for applying said input pulses to the main winding, whereby the magnetic core means saturates in one direction after a plurality of the said input pulses are applied to the main winding, a semiconductive device, a holding winding and a control winding disposed in inductive relationship with the magnetic core means, a bias source connected to maintain the semiconductive device non-conductive while the said input pulses are being applied to the main winding; other circuit means, including said holding winding for rendering said semiconductive device conductive, when said magnetic core means saturates in said one direction; further circuit means, interconnected with the semiconductive device and with the control winding, for effecting a flow of current through the control winding when the semiconductive device becomes conductive, to thereby drive the magnetic core means to saturation in the other direction, the current flow through the control winding effecting an induced voltage across the holding winding to maintain the semiconductive device conductive until the magnetic core means saturates in said other direction, and an output winding disposed in inductive relationship with the magnetic core means, means for interconnecting said load with the output winding, second magnetic core means; second switch means; first winding means inductively disposed on said second magnetic core means adapted to render conductive said second switch means when said core is proceeding to saturation in a first sense, means coupling said first winding means to said first magnetic core means for driving said second magnetic core means to saturation in said first sense when said first magnetic core means is proceeding to saturation in said other sense; second winding means disposed in inductive relationship with said second magnetic core means adapted to be energized when said second switch means is rendered conductive to drive said second magnetic core means to saturation in said one sense; means including unilateral conductive means coupled to said second winding means for driving said second magnetic core means to saturation in a second sense opposite to said first sense; means including third switch means responsive to said second magnetic core means proceeding to saturation in said second sense for generating a control pulse having a characteristic the magnitude of which is controllable by a human operator; means coupling said control pulse to said first magnetic core means so that the magnetic flux level thereof is variable in accordance with said magnitude of said characteristic.

11. A counting circuit comprising a plurality of tandem-connected counter stages, saturable core means for each said counter stage, said saturable core means causing each said counter stage to store a number of input pulses before emitting an output pulse to a succeeding stage, control means for establishing an initial flux level in said saturable core means to selectively control the number of input pulses to a stage necessary to cause an output pulse.

12. A counting circuit comprising a plurality of tandem-connected counter stages, saturable core means for each said counter stage, said saturable core means causing each said counter stage to store a number of input pulses before emitting an output pulse to a succeeding stage, control means for establishing an initial flux level in said saturable core means to selectively control the number of input pulses to a stage necessary to cause an output pulse, said tandem-connected counter stages comprising a final stage having a control output winding coupled to its said saturable core.

13. A counting circuit comprising a plurality of tandem-connected counter stages, saturable core means for each said counter stage, said saturable core means causing each said counter stage to store a number of input pulses before emitting an output pulse to a succeeding stage, control means for establishing an initial flux level in said saturable core means to selectively control the number of input pulses to a stage necessary to cause an output pulse, said tandem-connected counter stages comprising a fined stage having a control output winding coupled to its said saturable core, said control means comprising a detector means associated with said final counter stage for applying an initial flux to said saturable cores for selectively controlling the number of input pulses to said cores necessary to cause an output pulse from each core.

14. A counting circuit comprising a plurality of tandem-connected counter stages, saturable core means for each said counter stage, said saturable core means causing each said counter stage to store a number of input pulses before emitting an output pulse to a succeeding stage, control means for establishing an initial flux level in said saturable core means to selectively control the number of input pulses to a stage necessary to cause an output pulse, said tandem-connected counter stages comprising a final stage having a control output winding coupled to its said saturable core, said control means comprising a detector means associated with said final counter stage for applying an initial flux to said saturable cores for selectively controlling the number of input pulses to said cores necessary to cause an output pulse from each core, said detector means comprising variable detector control means for selectively controlling the initial flux level applied to each said saturable core.

15. A counting circuit comprising a plurality of tandem-connected counter stages, saturable core means for each said counter stage, said saturable core means causing each said counter stage to store a number of input pulses before emitting an output pulse to a succeeding stage, control means for establishing an initial flux level in said saturable core means to selectively control the number of input pulses to a stage necessary to cause an output pulse, said tandem-connected counter stages comprising a final stage having a control output winding coupled to its said saturable core, said control means comprising a detector means associated with said final counter stage for applying an initial flux to said saturable cores for selectively controlling the number of input pulses to said cores necessary to cause an output pulse from each core, said detector means comprising variable detector control means for selectively controlling the initial flux level applied to each said saturable core, said detector means comprising a transistor control circuit for each said saturable core.

No references cited.